Figures 1, 2:
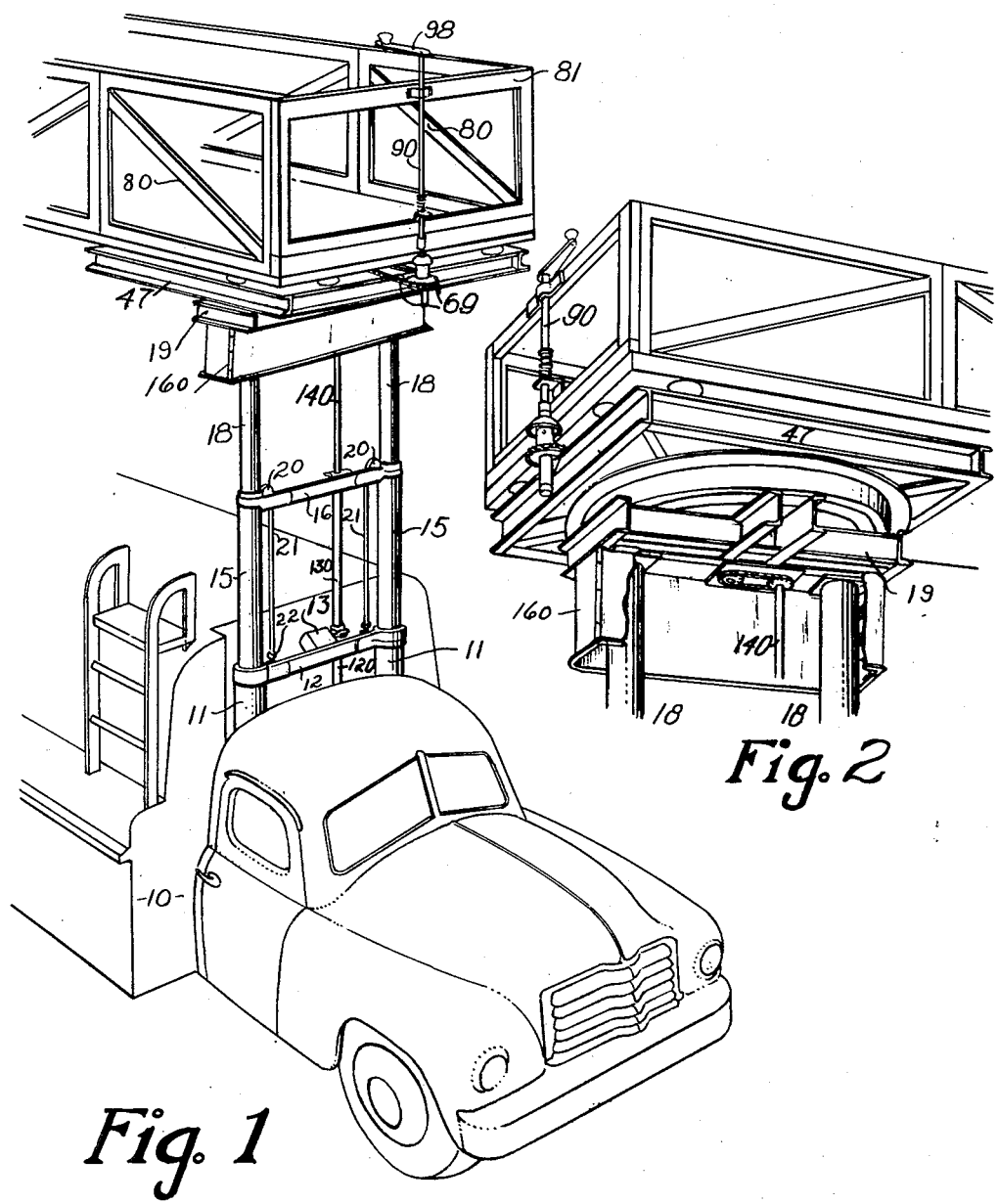

July 28, 1953 J. SMID ET AL 2,647,022
TOWER VEHICLE
Filed July 31, 1948 3 Sheets-Sheet 1

INVENTORS.
JAMES SMID, MERTON SMITH,
AND FRANK A. LESKOVEC
BY
Bates Teare & McBean
ATTORNEYS July 28, 1953 J. SMID ET AL 2,647,022
TOWER VEHICLE
Filed July 31, 1948 3 Sheets-Sheet 2

INVENTORS.
JAMES SMID, MERTON SMITH,
and FRANK A. LESKOVEC
BY
Bates Teare & McBean
ATTORNEYS July 28, 1953    J. SMID ET AL    2,647,022
TOWER VEHICLE
Filed July 31, 1948    3 Sheets-Sheet 3
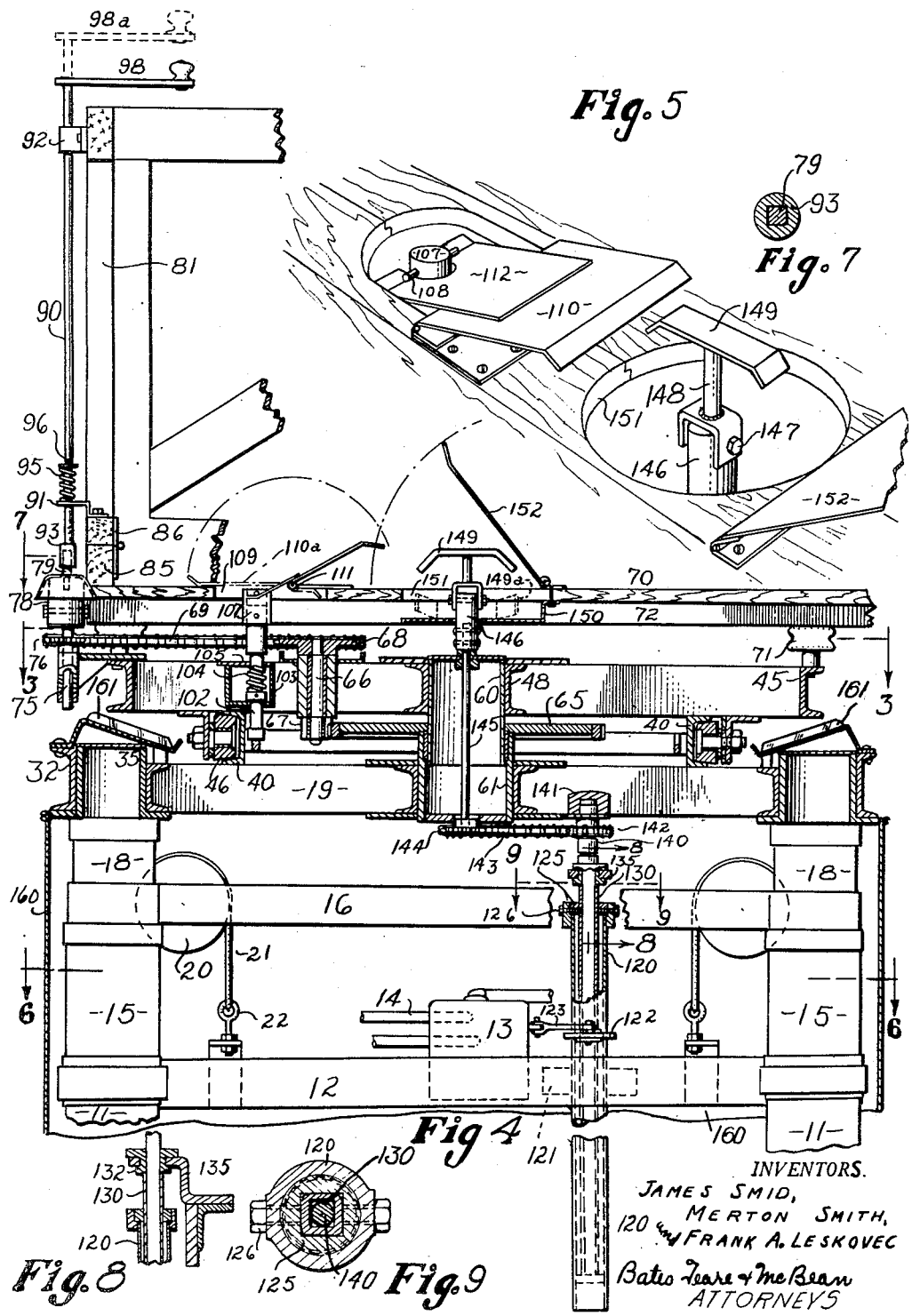
INVENTORS.
JAMES SMID,
MERTON SMITH,
FRANK A. LESKOVEC
Bates Teare & McBean
ATTORNEYS Patented July 28, 1953

2,647,022

UNITED STATES PATENT OFFICE 2,647,022

TOWER VEHICLE

James Smid and Merton Smith, Cleveland, and Frank A. Leskovec, Geneva, Ohio, assignors, by mesne assignments, to McCabe-Powers Auto Body Co., St. Louis, Mo., a corporation of Missouri Application July 31, 1948, Serial No. 41,814

1 Claim. (Cl. 304—32)

This invention relates to a turntable locking structure adapted for use in a tower vehicle, for instance, an automotive truck, having a tower carrying an elevated platform adapted to support workers in position for servicing some overhead construction. The tower is preferably of a telescopic type adapted to hold the platform at various elevations and the platform itself may be cantilevered on a turntable to enable the workers to occupy various positions which may be beyond the confines of the truck. Such platform so carried on a tower truck is very useful in enabling the servicing, for instance, of overhead wires, trolley wires, for example.

One of the objects of the present invention is to provide a platform with a comparatively smooth top surface so that danger of the operator's tripping is avoided, while at the same time provision is made for actuating certain controls available through the floor of the platform. Another feature is the provision of simple and effective means for locking the turntable in any desired position. The tower is preferably vertical extensible, and our invention provides safe effective means at the platform for actuating the elevating mechanism for the tower.

Our invention is well adapted for a tower vehicle where the tower is extensible by having vertical mounted tubular members one within the other, the lowermost member being carried rigidly by the truck body and the uppermost member carrying the platform at its top and telescopically connected to the lower section. We have illustrated the tower in the form of a double telescoping vertical support, that is to say, a pair of fixed vertical tubes on the truck, a pair of slidable vertical tubes within the fixed tubes, and a pair of upper vertical tubular members slidable within said slidable tubes.

We have provided for hydraulic means to raise the intermediate tube out of the fixed lower member and cable mechanism for automatically moving the upper section at a higher speed than the intermediate section, so that an extension of the intermediate section in the lower section and of the upper section in the intermediate section takes place at the same time. This particular means of providing an extensible tower is not our invention, being set out in Patent No. 2,196,511, granted April 9, 1940, to J. P. Wagner and Henry C. Rau, to which reference is made for a fuller description of such means. Our invention, however, providing a turntable on the top of the upper vertical member of such extensible tower, and the various features above alluded to, are all improvements over the patent mentioned.

Our invention is illustrated in the drawings hereof and hereinafter described in detail and the essential novel features are set out in the claim.

Figure 6:
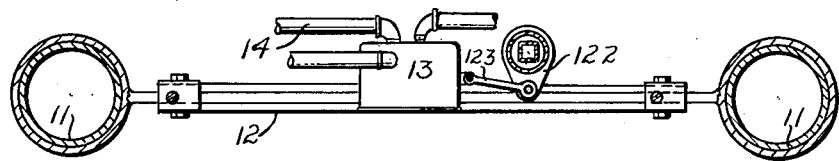
Figure 3:
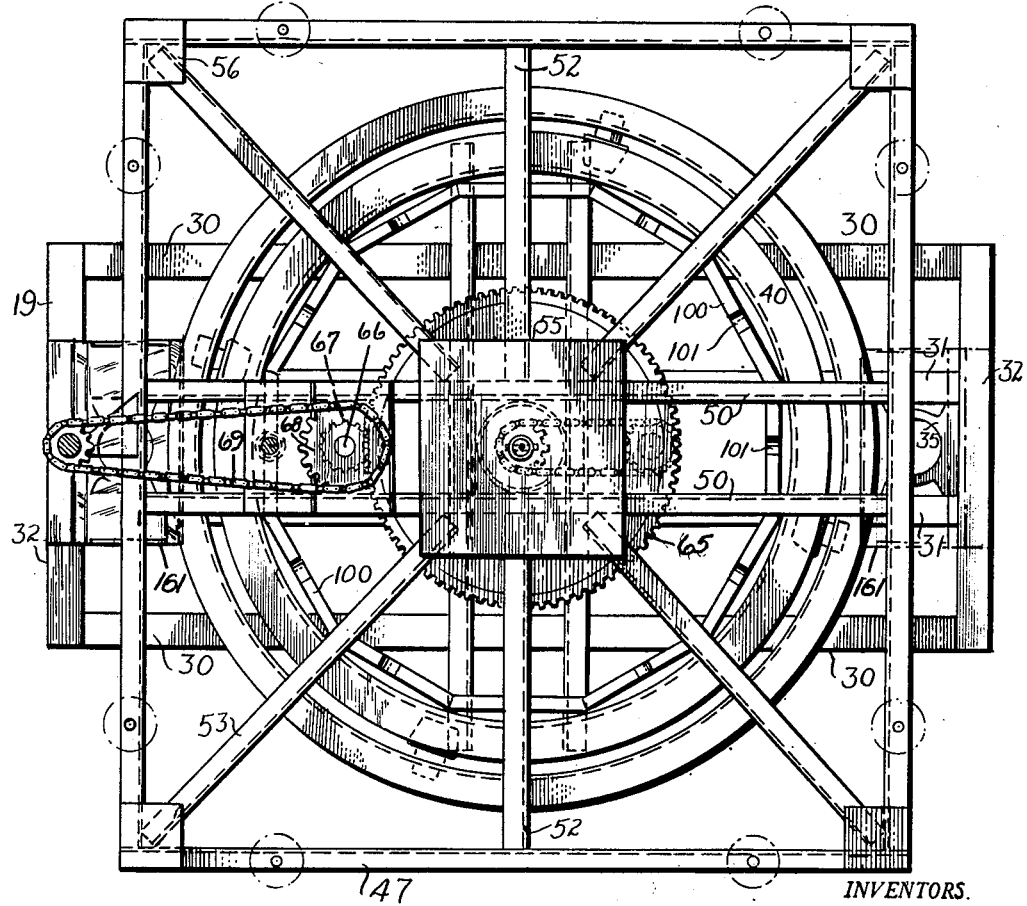

In the drawings, Fig. 1 is a perspective of the forward portion of the vehicle and tower and platform; Fig. 2 is a bottom perspective of the turntable and a portion of the platform; Fig. 3 is a plan of the turntable and the frame for the platform; Fig. 4 is a vertical section of the upper portion of the tower, the turntable and the platform with the various parts broken away; Fig. 5 is a perspective of a portion of the platform floor showing the trap doors open; Fig. 6 is a cross section through the telescoping vertical standards of the tower, as indicated by the line 6—6 on Fig. 4; Fig. 7 is a detail in horizontal cross section on the line 7—7 in Fig. 4; Fig. 8 is a vertical section through the upper portion of the telescopic valve-operating shaft, as indicated by the line 8—8 on Fig. 4; Fig. 9 is a cross section, as indicated by the line 9—9 on Fig. 4.

In Fig. 1, 10 designates the vehicle proper which, as stated, may be an automotive truck. Rigidly mounted on this vehicle are a pair of vertical tubes 11 located in a transverse plane across the truck and, if desired, suitably braced by means not shown. At the top of these tubes is a cross head 12 rigid with the tubes.

Slidably mounted in the fixed tubes 11 are vertically slidable tubes 15 having a cross head 16 at their upper ends, and vertically slidable in these intermediate tubes 15 are the topmost tubes 18 carrying at their top a cross head 19. It will be understood that the tubes 15 are closed at their lower ends to make them plungers within the stationary tubes 11 and suitable hydraulic pumping means (not shown) is provided on the truck for forcing liquid under pressure into the tubes 11. This hydraulic means is controlled by suitable valve in a casing 13 mounted on the cross head 12 for establishing communication between suitable conduits as 14, Fig. 6.

As shown, the cross head 16 at the top of the intermediate tubes 15 carries a pair of sheaves 20 over which extend cables 21 which are anchored at their lower ends as 22 to the stationary cross head 12. After passing over the sheaves 20 the cables 21 depend within the tubes 15 and at their lower ends are secured to the lower ends of the tubes 18. Such downward portion of the cables preferably lie in a groove in the uppermost tubes. The construction in this regard may be according to prior patent mentioned.

It results from this described system of elevation that when the valve is operated to charge the lower cylinders 11, such action hydraulically raises the plungers 15, and the anchored cables with the traveling sheaves raise the telescoping tubes 18 at twice the speed of the intermediate tube 15. Accordingly, for traveling purposes the tubes 15 may be housed substantially entirely within the stationary cylinders 11, and the tubes 18 substantially entirely within the tubes 15, but when the vehicle is at the region of use the simple hydraulic action may result in a decided elevation of the platform carried at the top of the tubes 18.

The cross head 19 at the top of the upper tower tubes, shown somewhat conventionally in Figs. 1 and 2, is preferably a built-up construction of a set of main parallel beams and shorter transverse beams some of which are illustrated in Figs. 3 and 4 at 30, 31, 32. As indicated in Fig. 4, the upper ends of the topmost tubes 18 have extensions 35 snugly secured between the intermediate beams 31 and 32.

Mounted on top of the various main beams of the movable cross head 19 is a circular track 40 shown as made of a channel beam facing outwardly. A suitable turntable 45 is located above this track and carries rollers 46 extending into the channel beam 40, supporting the turntable thereon. This turntable is preferably of square construction and is shown as made up of four marginal channel beams 47 connected with a central hub 48 by various beams leading outwardly from the hub to the open square frame.

We have shown in the turntable two parallel beams 50 comparatively close together, two other beams 52 at right angles to the beams 50 and four diagonal beams 53 leading from the central hub to the corners of the square frame. The connections are braced by suitable gusset plates as shown at 55 and 56.

At its center, the turntable carries a sleeve 60 within its hub 48 and extending downwardly into a sleeve 61 extending upwardly from the cross head 19. Mounted on the sleeve 61 and rigidly keyed to it is a comparatively large stationary horizontal gear 65. Mounted in the turntable is a vertical shaft 66 carrying on its lower end a pinion 67 meshing with the gear 65 and carrying at its upper end a sprocket wheel 68 over which is looped a sprocket chain 69. The operation of this chain, therefore (by means hereinafter described) rotates the pinion 67, causes it to travel about the periphery of the stationary gear 65 and thus turn the turntable one direction or the other, as desired.

Mounted on the turntable in a manner to hold it a short distance above the top of the turntable is the worker's platform 70. The mounting is effected through intermediate insulators 71 secured to the top of the boundary members of the turntable frame and supporting the platform. The platform carries adjacent one end a vertical shaft 75 on which is a sprocket wheel 76 over which the sprocket chain 69, heretofore mentioned, extends. This shaft 75 has an insulating head 78 which is provided with an upwardly extending stud 79 which may be square in cross section. Suitable manual operating device, to be described shortly, may engage the stud 79, thereby rotate the shaft 75 and drive the sprocket chain and thence the pinion 67 to turn the table and platform as desired.

The platform 70 is elongated rectangular horizontal member having suitable beams 72 and a flooring of wooden planks on the beams. Vertical railing is provided at each margin of the platform. Thus we have shown a pair of side railings 80 and one of the end railings 81. All of these railings are a form of latticed panels movably secured or hinged at their lower edges to the platfrom.

We have indicated in Fig. 4, a platform beam 85 stationary on the platform and a hinge 86 connecting the end railing with that beam, so that it may be swung down on top of the side railings after they have been folded in. Suitable bolts (not shown) may connect the upper corners of the different railings when they are in the vertical position shown in Figs. 1 and 2.

One of the end railings as 81 carries a manually operable shaft 90 for actuating the turntable mechanism. This shaft is slidably carried in brackets 91 and 92 mounted on this railing and its lower end carries a square socket 93 which is adapted to snugly embrace the square stud 79— see Fig. 7. The shaft 90 is normally held with the socket 93 out of contact with the stud 79. The means for this purpose is shown as a helical compression spring 95 surrounding the shaft 90 and bearing at its lower end against the bracket 91 and at its upper end against a stop 96 on a shaft 90. At its upper end the shaft 90 is provided with a handle crank 98 by which the shaft may be rotated. The normal position of the shaft and handle is shown in Fig. 1 and indicated at 98a in broken lines in Fig. 4; its operative position is shown in full lines in Fig. 4 and in Fig. 2.

In the normal position, the operating shaft 90 is entirely disconnected from the stud 79. Accordingly, this manual mechanism does not interfere at all with the end railing being folded down whenever desired. However, when it is desired to swing the platform in one direction or the other the operator need merely press down on the crank 98 to bring it into the position shown in full lines in Figs. 2 and 4, and then by rotating the crank he may rotate the pinion 67 and turn the turntable and platform as desired.

To lock the turntable and platform in any set position, we provide an annular bar or course of bars 100 secured to the inner face of the trackway 40, each bar having an upwardly facing notch 101, and we provide the turntable with a vertical locking plunger 102 adapted to occupy any notch with which it happens to register. This locking plunger 102 is slidably mounted in frame members 103 carried by the turntable and is pressed downwardly by a spring 104 surrounding the plunger and bearing at its lower end against the collar on the plunger and at its upper end against a suitable stop 105 on the turntable frame. The spring 104 normally maintains the locking plunger in engagement with one of the notches 101, thereby locks the platform to the track 40 and to the cross head 19.

The plunger 102 is provided with a head 107 of insulating material. From this head projects in each direction a diametrically mounted pin 108. This head and pin normally occupy an opening 109 in the planking of the platform. The head 107 is normally covered by a trap door 110 hinged at 111 to the platform. This trap door has an extension at 112, Figs. 4 and 5, which extends beyond the hinge thereof and by reason of a notch extends about the plunger head 107 beneath the pins 108.

When the operator desires to unlock the turntable, preparatory to changing the position of the platform, he throws open the trap door from the position indicated by broken lines at 110a in Fig. 4 to some such inclined position, as shown in full lines in that figure and in Fig. 5. In this position the extension 112 engages the underside of the plunger pin 108. Now if the operator bears his weight on the projecting portion of the trap door 110 he forces it down into horizontal position and thereby lifts the plunger and unlocks the turntable.

While the operator is standing on the depressed trap door 10 he may operate the crank 98 to turn the platform as desired. When he brings it into approximately the desired position he merely steps off of the elevated trap door and closes it into the position shown in broken lines. This frees the plunger and if it happens to be directly aligned with one of the notches 101 it immediately springs down into that notch.

If the plunger 102 does not align with any notch, the operator is advised thereof by the projecting upper end of the plunger head which prevents the entire closing of the trap door and he then turns the crank in one direction or the other until the plunger is brought into registration with a notch, whereupon the plunger drops into such notch and locks the turntable and platform. This final descent of the plunger frees the trap door so that it may return to its normal horizontal position, as indicated at 110a.

To enable the operator to control the elevation of the tower from the platform, we provide a telescopic connection between an operating handle on the platform and the controlling valve in the casing 13 on the cross head 12. We will now describe this construction.

We provide a vertical tube 120, Figs. 1 and 4, which is suitably journaled near its lower end by any suitable means, as for instance, by an embracing strap 121, Fig. 4, secured to the stationary cross head 12. This tube carries a rock arm 122, Figs. 4 and 6, which is connected by a link 123 with the valve in the casing 13. Accordingly, the oscillation of the tube 120 in one direction or the other may operate the valve.

The tube 120 is provided at its upper end with a plug 125 shown as held by cap screws 126, Figs. 4 and 9, and has a square opening through it. A vertical tube of square formation 130 extends through the square opening in the plug 125. This square tube is provided with a collar 132 having an external groove occupied by the horizontal arm of a bracket 135 secured to the movable cross head 16 as shown in Figs. 4 and 8.

Finally, extending into the square tube 130 is a round shaft 140 which has a square head at its lower end slidably engaging the square interior of the tube 130. The upper end of this shaft 140 is journaled in a suitable bearing 141 in the cross head 19. This shaft (or, more specifically, a sleeve rigidly embracing it) carries a sprocket wheel 142. A sprocket chain 143 loops over this wheel and over a sprocket wheel 144 on a central operating shaft 145.

The shaft 145 is suitably journaled at the axis of the turntable and carries at its upper end an insulating head 146. Connected to the head 146 by a horizontal pivot 147 is the bifurcated shank 148 of a T-handle 149. Normally the handle 149 lies in the idle position indicated in broken lines 149a in Fig. 4, where it rests on a supporting plate 150 carried on the underside of the platform planking and beneath an opening 151 in such planking. This opening is normally closed by a trap door 152.

When the trap door 152 is swung up from its normal horizontal position, the attendant on the platform may raise the T-handle 149 from its idle position into the position shown in Figs. 4 and 5, and by means of that handle rotate the shaft 145 which through the sprocket chain rotates the shaft 140, the square tube 130 and the extension tube 120. This swings the rock arm 122 in one direction or the other and operates the controlling valve, as desired, to raise or lower the platform.

It will be understood from the description given that we have provided an extensible tower vehicle, in the form which may readily travel from place to place. It has a comparatively low height when the extensible tower is entirely collapsed and the railings folded down. Then upon arrival at the place of use, it is merely necessary for the attendants to mount to the platform, raise the railings and operate the control handle 149 to raise the platform to the desired height. Then by releasing the turntable lock and operating the hand crank, the platform itself may be swung in the direction desired.

To protect the telescopic supports from weather while the vehicle is standing, or traveling with the tower lowered, we secure to the cross head 19 a transverse flattened hood 160 open at the bottom and enclosing the upper end portions of the tubes 18 with sufficient clearance to extend about the cross head 12 at the head of the lowermost tubes. We also provide water shedding shields 161 on the cross head 19 over the tops of the tubes. Accordingly, when the tower is in its collapsed position all of the telescopic joints are thoroughly protected from water or dirt.

The weather shields 161 just mentioned are preferably rectangular sheet metal members of the form shown in cross section in Fig. 4 and in plan at the left hand portion of Fig. 3. A similar shield is used at the right hand portion of that figure but is omitted for clearness of illustration, its position being indicated by the broken lines 161. These shields have their outer portions more or less upright to raise the outer edge of the shield and cause it to drain inwardly, while the inner edges and the ends are provided with upward flanges. This construction provides draining troughs which carry any water away and discharge it well beyond the region of the telescoping tubes.

The insulating support for the platform and the insulating connections between all of the operating parts on the platform and the mechanism actuated thereby gives thorough protection to the workmen on the platform against possibility of forming a ground connection through the tower and the possibility of thus receiving an undesirable shock from such charged wire on which they may be working. Also the substantially level platform enables the workers thereon to move about freely as necessary.

When the platform has been rotated in the desired direction its lock firmly holds it in that position until it is desired to return it to its normal position directly over the truck body. By having the sprocket chain connection between the telescopic valve operating member and the operating shaft at the center of the turntable, there is no danger of binding on the telescopic member due to any stresses resulting from the platform being cantilevered from one side or the other of the turntable. By having the separable connection between the operating crank at the top of one of the railings of the platform, we enable the operating crank to be in a very convenient position without interfering at all with the folding down of such railing when desired.

We claim:

For use in a tower vehicle including a tower, a track structure rigidly mounted on the upper end of the tower and provided with lock-forming means having a plurality of upwardly opening detent recesses, a turntable rotatably mounted on the track and a platform carried by the turntable having a floor provided with an opening through it; a hinged trap door adapted to cover said opening, a lock for the turntable including a vertically shiftable bolt, the lower end of which is adapted for optional engagement in any one of the detent recesses, said bolt having a head projecting upwardly toward the opening and terminating in downwardly spaced relation to the top surface of the floor, said bolt being provided at such upper end with oppositely projecting diametral pins, a projection on the underside of the trap door extended beyond its hinge and adapted to extend under said pins when the trap door is in an upwardly inclined position, whereby the operator by standing on the trap door in such position may elevate the lock to idle position by swinging downwardly the free edge of the trap door.

JAMES SMID.
MERTON SMITH.
FRANK A. LESKOVEC.

References Cited in the file of this patent

UNITED STATES PATENTS

| Number | Name | Date |
|---|---|---|
| 157,889 | Thompson | Dec. 15, 1874 |
| 1,087,424 | Bauman | Feb. 17, 1914 |
| 1,092,096 | Donigan | Mar. 31, 1914 |
| 1,115,242 | Pilling | Oct. 27, 1914 |
| 1,210,288 | Farr | Dec. 26, 1916 |
| 1,337,487 | Schlatter | Apr. 20, 1920 |
| 1,638,611 | Baldwin | Aug. 9, 1927 |
| 1,669,124 | Graves | May 8, 1928 |
| 1,718,979 | Protzeller | July 2, 1929 |
| 1,823,977 | Hendee | Sept. 22, 1931 |
| 2,030,650 | Miller | Feb. 11, 1936 |
| 2,196,511 | Wagner et al. | Apr. 9, 1940 |
| 2,204,671 | Erickson et al. | June 18, 1940 |
| 2,303,670 | Turner | Dec. 1, 1942 |

FOREIGN PATENTS

| Number | Country | Date |
|---|---|---|
| 25,783 | Switzerland | Apr. 22, 1902 |
| 449,754 | Great Britain | June 29, 1936 |